Sept. 23, 1930.  J. C. McCUNE  1,776,290
FLUID PRESSURE BRAKE
Filed April 10, 1928
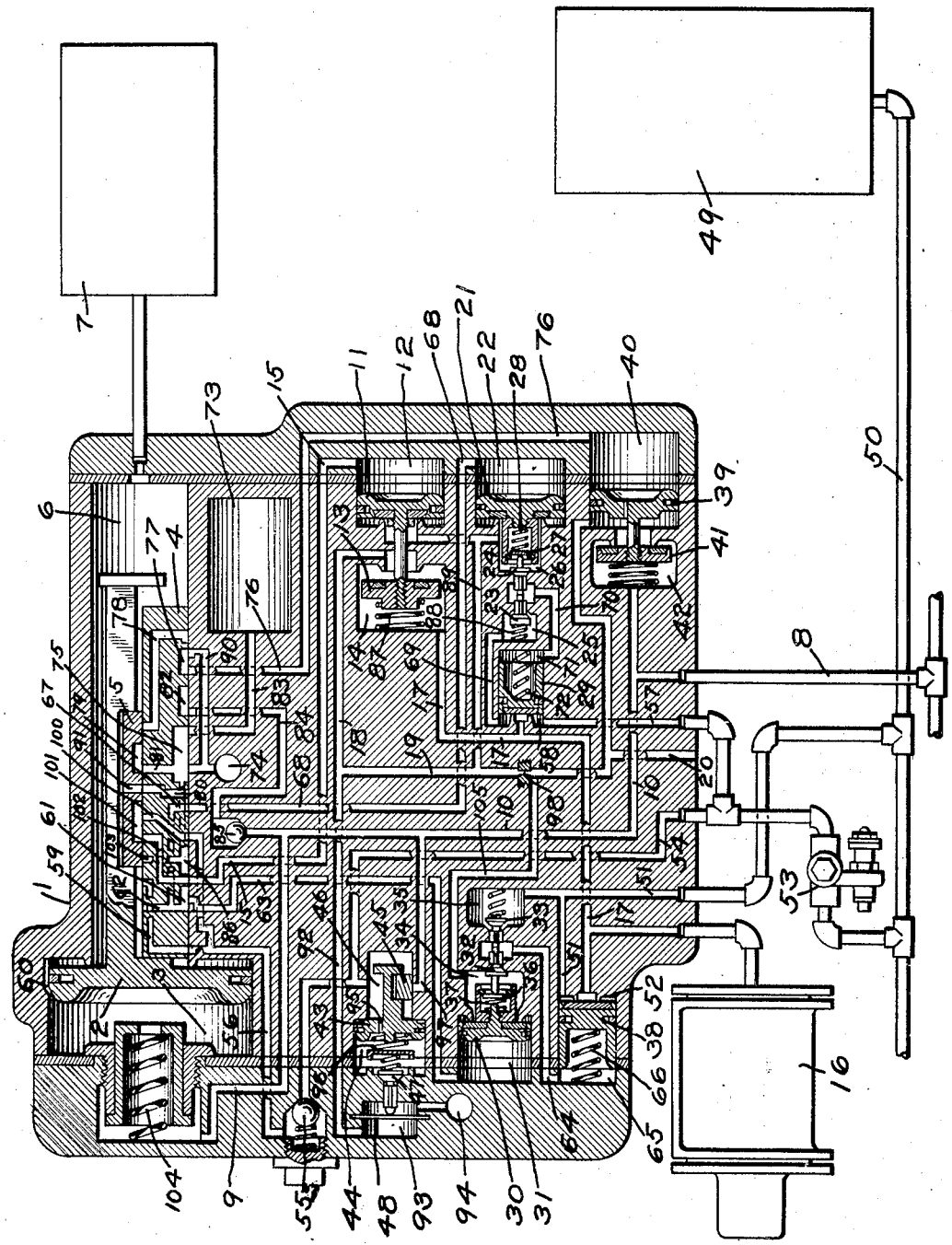
INVENTOR
JOSEPH C. McCUNE
BY Wm. M. Cady
ATTORNEY Patented Sept. 23, 1930

1,776,290

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed April 10, 1928. Serial No. 268,829.

This invention relates to fluid pressure brakes, and more particularly to a brake controlling valve device.

One object of my invention is to provide an improved brake controlling valve device of simple and compact design.

Another object of my invention is to provide a brake controlling valve device which is capable of quickly effecting either an application or a release of the brakes.

Other objects and advantages will appear in the following more detailed description of the invention.

In the accompanying drawing, the single figure is a diagrammatic view of a fluid pressure brake equipment embodying my invention.

The brake controlling valve device may comprise a casing 1 containing a triple valve device having a piston 2 contained in piston chamber 3, a main slide valve 4 and a graduating valve 5, contained in valve chamber 6, and adapted to be operated by piston 2. The valve chamber 6 is connected to an auxiliary reservoir 7 and the piston chamber 3 is connected to the brake pipe 8 through passages 9 and 10.

Associated in the casing is a release controlling valve device comprising a piston 11 contained in piston chamber 12 and a valve 13 operable by said piston and contained in valve chamber 14. The piston chamber 12 is connected to passage 15 leading to the seat of slide valve 4 and valve 13 controls communication from the brake cylinder 16 through passage 17 to a passage 18 which leads to passage 19 and an atmospheric exhaust passage 20.

A service application valve device is provided comprising a piston 21 contained in piston chamber 22 and double beat valves 23 and 24 adapted to be operated by piston 21 and contained in the respective valve chambers 25 and 26. The piston 21 is adapted to seat in its inner position, as shown in the drawing and in order to ensure that the piston as well as the valve 24 will be seated, the valve 24 is provided with a stem which engages a movable disk 27 mounted within a cylindrical extension of the piston 21, the disk 27 being acted upon by a spring 28, so that relative movement is permitted between the valve 24 and the piston 21, thus ensuring that both the piston and the valve will be held seated in the inner position of the piston.

The operation of the double beat valves 23 and 24 controls the operation of a valve piston 29 which in turn controls the supply of fluid under pressure to the brake cylinder in effecting an application of the brakes.

For effecting an emergency application of the brakes, a valve device is provided similar to the service application valve device and comprising a piston 30 contained in piston chamber 31 and double beat valves 32 and 33 adapted to be operated by piston 30 and contained in the respective valve chambers 34 and 35.

Piston 30 is adapted to seat in its inner position, as shown in the drawing, and the valve 32 is provided with a stem adapted to engage a disk 36 mounted in a cylindrical extension of the piston 30 and subject to the pressure of a spring 37.

The valves 32 and 33 control the operation of a valve piston 38, which in turn controls the supply of fluid under pressure to the brake cylinder in effecting an emergency application of the brakes.

A quick action valve device is provided comprising a piston 39 contained in piston chamber 40 and a brake pipe vent valve 41, contained in valve chamber 42 and adapted to be operated by piston 39.

For securing a quick serial release of the brakes a valve device is provided comprising a piston 43, contained in piston chamber 44 and a slide valve 45 contained in valve chamber 46 and adapted to be operated by piston 43. A valve 47 controls the venting of fluid under pressure from piston chamber 44 and said valve is adapted to be operated by a flexible diaphragm 48.

The brake controlling valve device, as above described, is adapted more particularly for use on cars equipped with a source of fluid under pressure, such as multiple unit cars which are employed in subway and other heavy traction service.

Each car of the train is provided with a main reservoir 49 adapted to be maintained charged with fluid under pressure in the usual manner and the main reservoir is connected by a pipe 50 with a passage 51 which leads to valve chamber 35 of the high pressure emergency valve device, and also to the chamber 52 at the outer seated area of valve piston 38.

The main reservoir pipe 50 is also connected to a feed valve device 53 which supplies fluid at a predetermined reduced pressure to passage 54 leading to valve chamber 46 and also past a check valve 55 to a passage 56 which leads to the seat of slide valve 4.

Fluid under pressure is also supplied by the feed valve device 53 to a passage 57 which leads to chamber 58 at the outer seated area of the valve piston 29.

In operation, when the brake pipe 8 is charged with fluid under pressure, the triple valve piston 2 is shifted to release position, as shown in the drawing, and valve chamber 6 and the auxiliary reservoir 7 are quickly charged with fluid under pressure supplied through the feed valve device 53, by way of passage 54, past check valve 55, passage 56, and port 59 in main slide valve 4. In order to prevent creation of a differential pressure on piston 2, through fluctuations in pressure, either in the brake pipe or in the valve chamber 6, a restricted passage 60 is provided around the triple valve piston 2, which serves to equalize the pressures on opposite sides of the piston.

In the release position of the triple valve parts, a cavity 61 in the main slide valve 4, which is open to valve chamber 6 through port 62, registers with passage 63, so that fluid under pressure is supplied from valve chamber 6 through passage 63 to piston chamber 31.

Fluid at feed valve pressure is also supplied to piston chamber 12, through a branch passage of passage 56, port 100 in main slide valve 4, cavity 101 in graduating slide valve 5, port 102 in main slide valve 4, and passage 15.

Fluid under pressure supplied to piston chamber 12 operates to shift piston 11 to its inner position, as shown, so that valve 13 is unseated. With valve 13 unseated, the brake cylinder 16 is connected to the atmosphere through passage 17 past the valve 13 to passage 18 and thence to the atmosphere through passages 19 and 20.

Fluid under pressure supplied to piston chamber 31 operates to shift piston 30 to the inner position, as shown in the drawing, so that the piston operates to seat valve 32 and unseat valve 33. With valve 33 unseated, fluid under pressure from the main reservoir 49 is supplied from valve chamber 35, through passage 64 to the chamber 65 at one side of valve piston 38. The chamber 52 at the opposite side of the valve piston is also supplied with fluid at main reservoir pressure through passage 51, but the inner seated area of the valve piston 38 being open to the brake cylinder 16 and therefore at atmospheric pressure, the spring 66 maintains the valve piston in its seated position, as shown in the drawing.

The piston chamber 22 is also supplied with fluid under pressure from valve chamber 6 through port 62, port 67, and passage 68, so that piston 21 is shifted to its inner position, as shown in the drawing and thereby the valve 24 is seated and the valve 23 unseated. With valve 23 unseated, fluid at feed valve pressure is supplied from chamber 58, through passage 69, chamber 25, past the valve 23 to passage 70, which leads to chamber 71. With chamber 71 charged with fluid under pressure, the valve piston 29 is held seated, as shown in the drawing, by spring 72.

A quick service chamber 73 is connected to exhaust port 74, through cavity 75 in slide valve 4, so that in release position, chamber 73 is maintained at atmospheric pressure.

Emergency quick action piston chamber 40 is connected to exhaust port 74, through passage 76, cavity 77 in slide valve 4, and passage 90.

In order to effect a service application of the brakes, the brake pipe pressure is reduced in the usual manner, and the triple valve piston 2 is then moved outwardly, first shifting the auxiliary slide valve 5, so as to uncover port 78 to valve chamber 6 and to cause cavity 79 to connect ports 80 and 81 in slide valve 4. By the same movement, the slide valve 5 covers port 59, so as to prevent flow of fluid from the feed valve 53 to the valve chamber 6. The main slide valve 4 is then shifted by movement of piston 2, so that cavity 82 in slide valve 4 connects passage 83 with passage 84. Fluid is then vented from the brake pipe 8 through passage 10 past the check valve 85 to the quick service chamber 73 so as to cause a local reduction in brake pipe pressure and quick serial action throughout the train.

Movement of the slide valve 4 toward service position causes cavity 86 to register with passage 15, and since cavity 86 is connected through a passage in the main slide valve to cavity 75, passage 15 and piston chamber 12 are connected to the atmospheric port 74. With chamber 12 at atmospheric pressure, spring 87 shifts the valve 13 to its seat, thus cutting off communication from the brake cylinder 16 to the exhaust passage 20.

In service position, port 80 registers with passage 68, so that chamber 22 is connected to the atmosphere through port 80, cavity 79, port 81, cavity 75 and exhaust port 74. With fluid under pressure vented from piston chamber 22, valve 23 is moved to its seat by spring 88 and valve 24 is unseated, so that fluid under pressure is vented from chamber 71 to the atmosphere through passage 70, passage 89, passage 19, and passage 20. Fluid at feed valve pressure acting in chamber 58 then shifts the valve piston 29, so that communication is opened from chamber 58 to passage 17 and the brake cylinder 16. Fluid under pressure is then supplied to the brake cylinder to effect an application of the brakes and flow continues, so long as the valve piston 29 is held in its open position, or until the brake cylinder pressure has been increased to full feed valve pressure.

In service position, port 78 in slide valve 4 registers with passage 90, leading to exhaust port 74, so that fluid under pressure is vented from valve chamber 6 and the auxiliary reservoir 7. When the auxiliary reservoir pressure has been reduced by venting to the exhaust port 74, to a degree slightly less than the reduced pressure in the brake pipe, the piston 2 will be operated to shift the auxiliary slide valve 5 to the right, so as to close the port 78 and cut off the further venting of fluid from the auxiliary reservoir.

The venting of fluid from the auxiliary reservoir while the parts remain in service position is at a restricted rate and consequently the piston 2 remains in service position for a predetermined period of time according to the degree of reduction in brake pipe pressure before the auxiliary reservoir pressure is reduced to a degree permitting the brake pipe pressure to move the piston 2 from service position.

As a consequence, the degree of pressure attained in the brake cylinder is dependent upon the time the triple valve parts remain in service position.

This movement of the slide valve 5 also causes the cavity 79 to move so as to cut off communication between ports 80 and 81 and to cause port 91 to register with port 80. Fluid under pressure is then supplied from valve chamber 6 to piston chamber 22 and piston 21 is therefore shifted to its inner position, causing the valve 24 to seat and the valve 23 to unseat. The unseating of valve 23 permits the equalization of fluid pressures on opposite sides of the valve piston 29, so that spring 72 operates to shift the valve piston 29 to its seat, so that further supply of fluid under pressure to the brake cylinder is cut off.

Since passage 15 remains connected to the exhaust port 74 during movement of the auxiliary valve 5, the ports being controlled entirely by the main slide valve 4, the release piston 11 is maintained in its position with the release valve 13 held closed on its seat.

Further reductions in brake pipe pressure may be made as desired, in order to further increase the pressure in the brake cylinder, the auxiliary slide valve 5 being moved by piston 2 so as to effect the venting of fluid from piston chamber 22 and thereby the operation of the valve piston 29, in the manner hereinbefore described, to admit fluid under pressure to the brake cylinder. Further venting of fluid from the auxiliary reservoir being effected until the brake pipe pressure slightly exceeds the pressure in valve chamber 6, when the piston 2 again operates to shift the auxiliary valve 5 to lap position.

In order to fully release the brakes, the brake pipe pressure is increased to the standard pressure carried in the system and the triple valve piston 2 is thereby shifted to release position in which fluid under pressure is supplied to piston chamber 12 through port 100, cavity 101, port 102, and passage 15. The release piston 11 is then shifted to its inner position, so that the release valve 13 is unseated, permitting the exhaust of fluid from the brake cylinder through passage 17, chamber 14, past the open valve 13, passage 18, passage 19, and exhaust passage 20.

At the same time, fluid discharged from the brake cylinder to passage 18, flows through passage 92 to chamber 93 at one side of diaphragm 48. The diaphragm 48 is then operated to unseat valve 47, so that fluid under pressure is vented from piston chamber 44 to exhaust port 94, the fluid pressures on opposite sides of piston 43 being normally maintained equalized, by flow through a restricted port 95 in piston 43, and piston 43 being then normally maintained in the position shown in the drawing by spring 96.

When fluid is vented from piston chamber 44, the fluid pressure in valve chamber 46 shifts the piston 43 to its outer position, causing the valve 45 to uncover passage 97. Fluid from the feed valve device 53 is then supplied to the brake pipe, so as to locally increase the brake pipe pressure and thus cause a quick serial release of the brakes throughout the train. A choke plug having a restricted port 98 is disposed in passage 19, so that the pressure of fluid flowing from the brake cylinder through passage 18 is temporarily held high enough to ensure movement of the diaphragm 44.

When the brake cylinder pressure has been reduced nearly to atmospheric pressure, the diaphragm 48 will be moved back to normal position by the spring acting on valve 47 and the valve 47 will seat, so that fluid under pressure will equalize on opposite sides of piston 43, through port 95, permitting the spring 96 to return the piston 43 to its normal position and causing the valve 45 to close passage 97.

With the main slide valve 4 and the auxiliary slide valve 5 in release position, fluid under pressure is supplied from the feed valve device 53 through port 59 to valve chamber 6, so that a quick recharge of the auxiliary reservoir is thus effected.

A gradual release of the brakes may be effected by causing a gradual increase in brake pipe pressure instead of a full increase. In this case, the gradual or partial increase in brake pipe pressure causes movement of the triple valve piston 2 to release position.

The release piston 11 is then operated to open the release valve 13 so that fluid under pressure is vented from the brake cylinder, but after a partial venting of fluid from the brake cylinder, the piston 2 is shifted outwardly by the increase in pressure in valve chamber 6, due to the supply of fluid under pressure thereto from the feed valve device 53, by way of port 59 and dependent upon the extent to which the brake pipe pressure is increased.

When the piston 2 moves outwardly, the graduating slide valve 4 is moved so as to cause the cavity 101 to connect port 102 with port 103 which opens into cavity 86. Since cavity 86 registers with passage 15 and since cavity 86 is connected to exhaust cavity 75, fluid under pressure will be vented from passage 15 and from piston chamber 12, so that the release piston 11 will be operated to shift the release valve 13 to its seat, thus cutting off the further release of fluid from the brake cylinder. By making a further gradual increase in brake pipe pressure, the piston 2 may be again shifted to its extreme inner position, and the piston 11 will be again operated to open the release valve 13, in the manner hereinbefore described.

When the brake pipe pressure is suddenly reduced, to effect an emergency application of the brakes, the triple valve piston 2 is shifted to its extreme left hand position, compressing the spring 104. In this movement, the main slide valve 4 is shifted, so that port 78 registers with passage 76 and the port 78 being uncovered by the initial movement of the graduating valve 5, fluid under pressure is supplied from valve chamber 6 and the auxiliary reservoir 7 to piston chamber 40.

The quick action piston 39 is then shifted to the left, so that the vent valve 41 is unseated and fluid under pressure is vented from the brake pipe to effect a local reduction in brake pipe pressure and quick serial action throughout the train.

In the emergency position of the main slide valve 4, cavity 86 registers with passage 63, so that piston chamber 31 is vented to the atmosphere through cavity 75 and exhaust port 74. Piston 30 is thereupon shifted to the left, permitting the valve 33 to seat and causing the valve 32 to be unseated. Fluid under pressure is then vented from piston chamber 65 through passage 64 to passage 105 which leads to brake cylinder exhaust passage 20. The piston chamber 65 being vented to the atmosphere, the fluid pressure acting in chamber 52 operates to shift the valve piston 38 to the left, so that communication is opened from the main reservoir passage 51 to passage 17 leading to the brake cylinder.

Fluid at main reservoir pressure is therefore supplied to the brake cylinder to effect a high pressure emergency application of the brakes.

In emergency position of slide valve 4, cavity 86 also registers with passage 15, so that piston chamber 12 is vented to the atmosphere, as in service, in order to effect the movement of the release piston 11 and thereby the release valve 13 to its seat.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe and brake cylinder, of a valve device subject to the opposing pressures of the brake pipe and a chamber and movable to brake application position upon a reduction in brake pipe pressure, fluid under pressure being vented from said chamber to the atmosphere in application position to effect the movement of the valve device to lap position, and valve means operated upon movement of said valve device to application position for supplying fluid under pressure to the brake cylinder.

2. In a fluid pressure brake, the combination with a brake pipe and brake cylinder, of a valve device subject to the opposing pressures of the brake pipe and a chamber and movable to brake application position upon a reduction in brake pipe pressure, fluid under pressure being vented from said chamber to the atmosphere in application position to effect the movement of the valve device to lap position, and valve means operated upon movement of said valve device to application position for supplying fluid under pressure to the brake cylinder and operated upon movement of said valve device to lap position for cutting off the supply of fluid to the brake cylinder.

3. In a fluid pressure brake, the combination with a brake pipe and brake cylinder, of a valve device subject to the opposing pressures of the brake pipe and a chamber normally charged with fluid under pressure and movable to brake application position upon a reduction in brake pipe pressure, fluid under pressure being vented from said chamber to the atmosphere in brake application position to effect movement of said valve device to lap position, and valve means operated upon movement of said valve device to brake application position for supplying fluid under pressure to the brake cylinder.

4. In a fluid pressure brake, the combination with a brake pipe and brake cylinder, of a release valve device operated by fluid under pressure for opening communication through which fluid is vented from the brake cylinder and upon a reduction in fluid pressure for closing said communication, and a controlling valve device subject to the opposing pressures of the brake pipe and a chamber normally charged with fluid under pressure and operated upon a reduction in brake pipe pressure for venting fluid from said release valve device.

5. In a fluid pressure brake, the combination with a brake pipe and brake cylinder, of a release valve device operated by fluid under pressure for opening communication through which fluid is vented from the brake cylinder and upon a reduction in fluid pressure for closing said communication, and a controlling valve device subject to the opposing pressures of the brake pipe and a chamber normally charged with fluid under pressure and adapted in release position to supply fluid under pressure to said release valve device and operated upon a reduction in brake pipe pressure for venting fluid from said release valve device.

6. In a fluid pressure brake, the combination with a brake pipe and brake cylinder, of an application valve device operated by fluid under pressure for cutting off communication through which fluid under pressure is supplied to the brake cylinder and upon a reduction in fluid pressure for opening said communication, and a controlling valve device subject to the opposing pressures of the brake pipe and a normally charged chamber and operated upon a reduction in brake pipe pressure for venting fluid from said application valve device.

7. In a fluid pressure brake, the combination with a brake pipe and brake cylinder, of a service application valve device for controlling the supply of fluid under pressure to the brake cylinder to effect a service application of the brakes, an emergency valve device for controlling the supply of fluid under pressure to the brake cylinder to effect an emergency application of the brakes, and a controlling valve device subject to the opposing pressures of the brake pipe and a normally charged chamber and operated upon a gradual reduction in brake pipe pressure for effecting the operation of said service application valve device and upon a sudden reduction in brake pipe pressure for effecting the operation of said emergency valve device.

8. In a fluid pressure brake, the combination with a brake pipe and brake cylinder, of a valve piston for controlling the supply of fluid under pressure to the brake cylinder, valve means operated upon a reduction in fluid pressure for effecting the operation of said valve piston, and a controlling valve device subject to the opposing pressures of the brake pipe and a chamber and operated upon a reduction in brake pipe pressure for effecting a reduction in fluid pressure on said valve means.

9. In a fluid pressure brake, the combination with a brake pipe and a brake cylinder, of a valve device operated upon a reduction in brake pipe pressure for effecting the supply of fluid under pressure to the brake cylinder and upon an increase in brake pipe pressure for effecting the release of fluid from the brake cylinder, and a valve device operated by the pressure of fluid released from the brake cylinder for supplying fluid under pressure to the brake pipe.

10. In a fluid pressure brake, the combination with a brake pipe, a brake cylinder, and a main reservoir normally charged with fluid under pressure, of a service application valve device for controlling the supply of fluid under pressure to the brake cylinder in a service application of the brakes, means for limiting the maximum pressure of fluid supplied by said valve device to a degree less than main reservoir pressure, an emergency valve device for controlling the supply of fluid under pressure from the main reservoir to the brake cylinder in an emergency application of the brakes, and a controlling valve device subject to the opposing pressures of the brake pipe, and a chamber normally charged with fluid under pressure for controlling the operation of said service and emergency valve devices.

11. In a fluid pressure brake, the combination with a brake pipe and brake cylinder, of a main reservoir, a reducing valve device for supplying fluid under pressure from the main reservoir at a reduced pressure, a valve device for supplying fluid under pressure from the main reservoir to the brake cylinder, a valve device for supplying fluid under pressure from said reducing valve device to the brake cylinder, and a valve device subject to the opposing pressures of the brake pipe and a chamber for controlling the operation of the other mentioned valve devices.

12. In a fluid pressure brake, the combination with a brake pipe and brake cylinder, of a valve device operated upon a reduction in brake pipe pressure for controlling the supply of fluid under pressure to the brake cylinder and means for holding said valve device in the position for supplying fluid to the brake cylinder for a predetermined period of time dependent upon the degree of reduction in brake pipe pressure.

13. In a fluid pressure brake, the combination with a brake cylinder, of a valve device for controlling the flow of fluid under pressure to the brake cylinder, and means associated with said valve device for determining the amount of fluid supplied to the brake cylinder by the period of time the valve device remains in application position.

In testimony whereof I have hereunto set my hand.

JOSEPH C. McCUNE.